UNITED STATES PATENT OFFICE.

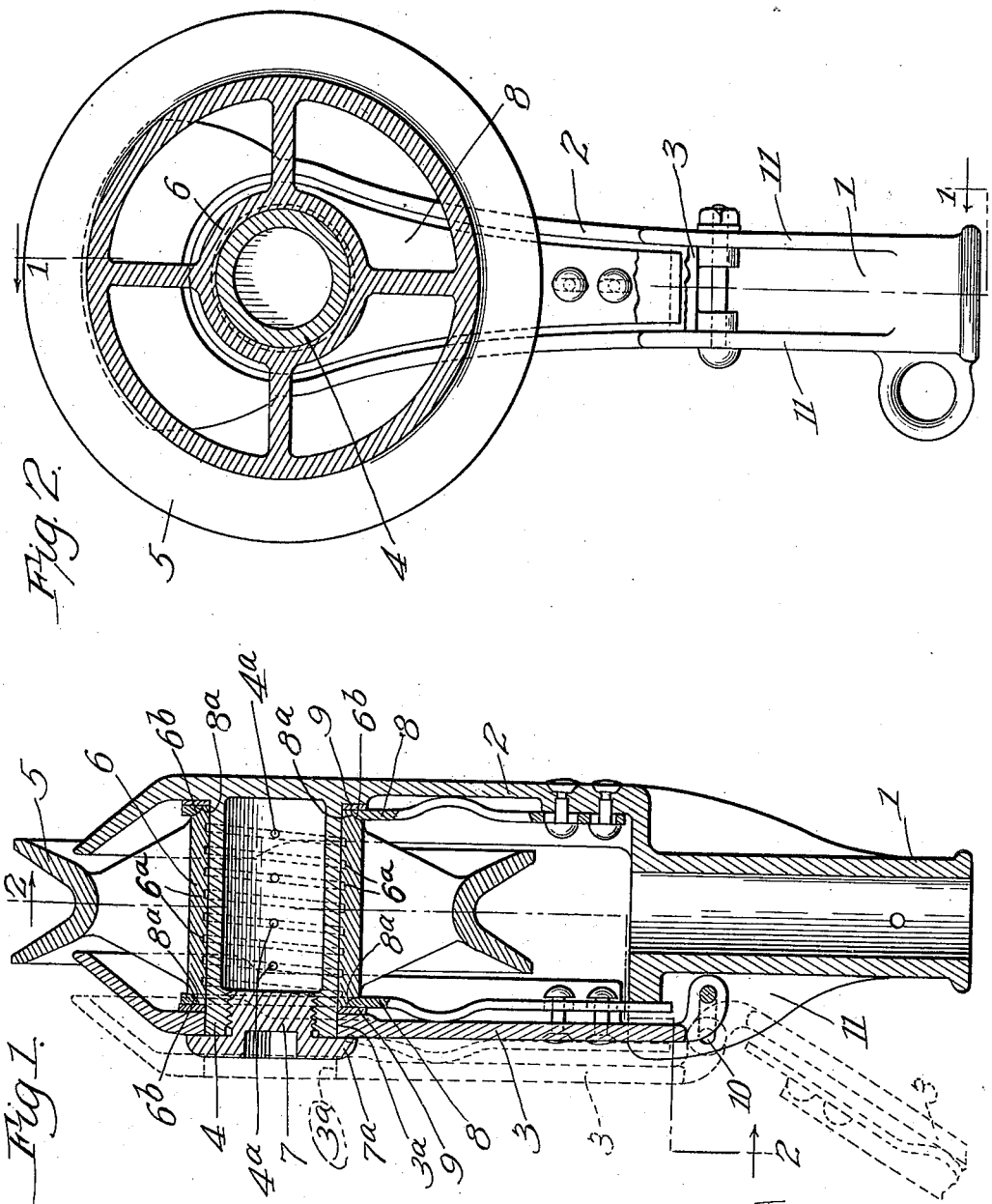

LEONARD W. ASHLEY, OF MILWAUKEE, WISCONSIN, ASSIGNOR OF ONE-HALF TO E. M. McVICKER, OF MILWAUKEE, WISCONSIN.

TROLLEY-WHEEL MOUNT.

1,141,518.  Specification of Letters Patent.  Patented June 1, 1915.

Application filed October 9, 1911. Serial No. 653,494.

*To all whom it may concern:*

Be it known that I, LEONARD W. ASHLEY, a citizen of the United States, residing at Milwaukee, in the county of Milwaukee and State of Wisconsin, have invented new and useful Improvements in Trolley-Wheel Mounts, of which the following is a specification, reference being had to the accompanying drawings, forming a part thereof.

The purpose of this invention is to provide an improved construction of trolley wheel and harp for electric railways.

It consists in the elements and features of construction shown and described, as indicated in the claim.

In the drawings: Figure 1 is a section axial with respect to the wheel and with respect to the harp stem of a trolley wheel and harp embodying this invention. Fig. 2 is an edge elevation of the same, showing one side member of the harp folded back for detaching the wheel.

In the structure shown in the drawings, the harp comprises a tubular stem, 1, by which it is attached to a pole; a bridge or back plate, 2; a front plate or retaining plate, 3, which is hinged to the stem, 1, for folding back from operative position, as shown in Fig. 2, and a hollow trolley-wheel bearing, 4, which is rigid with the back plate, 2. The trolley-wheel, 5, has the hub, 6, adapted to be mounted for rotation upon the hollow bearing, 4, and it is retained thereon against endwise displacement by the hinged front plate, 3, which has a circular aperture, $3^a$, to receive the protruding end of the wheel hub, and which shuts over the end of the hub, as is shown in the section view, Fig. 1. The front plate is retained in this position by means of a nut or plug, 7, which is screwed into the end of the hub, the latter being interiorly threaded for that purpose, and said plug or nut having marginal flange, $7^a$, which extends over the front plate. This plug or nut is designed to be screwed fast into the end of the hub and it will be observed that when thus screwed into place it is not in contact with any rotating part and it is therefore not likely to become unscrewed by accident.

The wheel hub is reduced in exterior diameter at both ends for a short distance, forming annular seats or shoulders, $6^b$, to receive the contact of the contact springs, 8,—8, which are secured respectively to the front and back plates, and so formed as to press yieldingly toward each other from the opposite sides against the opposite ends of the wheel hub which is thus embraced between the two contact springs. Preferably the two shoulders or seats, $6^b$, are conical or concavely curved in section radial with respect to the wheel, as shown, for insuring more perfect seating of the contact springs than might otherwise be obtained, the apertures, $8^a$, in the contact springs being similarly tapered. Annular washers, 9,—9, are provided on the wheel hub outside the contact springs, said washers resting against the ends of the hub and thereby inclosing the contact springs in their respective seats on the hub ends. The hub, at $6^a$, is interiorly grooved circumferentially; such grooving may be in the form of separate annular grooves or in the form of a spiral groove, or thread, for the purpose of holding lubricant between the inner surface of the hub and the outer surface of the hollow bearing, 4, and said hollow bearing has a plurality of apertures, $4^a$, to permit the passage out to the outer bearing surface of lubricant with which its axial cavity is designed to be stored. It will be observed that the nut or plug, 7, securely closes the interior cavity of the hollow bearing which thus serves as a secure reservoir for lubricant, and which may be initially so filled with lubricant that the plug or nut, 7, in being screwed home, forces the lubricant out through the apertures, $4^a$, filling the annular or spiral grooves in the inner surface of the hub, and so insuring perfect lubrication from the first.

Since one purpose of the movable side plate is to afford a positive support for the projecting end of the trolley wheel bearing, 4, so as to guard more securely against any bending or springing of said bearing, it is desirable to have the end of the bearing fixed accurately in the aperture of the side plate, and to this end it is necessary that the side plate should be applied directly,—that is, by direct axial movement onto the end of the bearing. And in order that it may be thus applied and at the same time may be permanently connected to the harp so as not to be lost or dropped in handling, the plate is connected with the harp hinge-wise, one of the two elements having the hinge pintle bearings elongated in direction parallel to the trolley wheel axis. Most conveniently the elongation is made in the apertures, 10, in the lugs, 11, formed on the harp for the hinge connection.

I claim:—

In combination with a trolley wheel having an axially chambered hub; a harp or hanger for the wheel comprising front and back plates, one of which is hinged to the harp for swinging away from the other plate, an axially chambered bearing for the wheel hub rigid with said other plate, the hinged plate having a circular aperture to receive and support the projecting end of the bearing, the hinge connection of the hinged plate to the harp comprising in one of said members pintle slots elongated in direction parallel to the wheel axis to permit direct insertion of the end of the bearing in the aperture of said hinged plate, and means for closing the end of the axial chamber of the bearing and retaining the hinged side plate engaged with said bearing.

In testimony whereof, I have hereunto set my hand at Chicago, Illinois, this 21st day of September 1911.

LEONARD W. ASHLEY.

Witnesses:
CHAS. S. BURTON,
M. GERTRUDE ADY.